(12) United States Patent
Sugimoto

(10) Patent No.: US 10,152,167 B2
(45) Date of Patent: Dec. 11, 2018

(54) OPERATION DISPLAY SYSTEM, OPERATION DISPLAY DEVICE, AND OPERATION DISPLAY PROGRAM

(71) Applicant: Konica Minolta, Inc., Chiyoda-ku, Tokyo (JP)

(72) Inventor: Yasuaki Sugimoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/160,545

(22) Filed: May 20, 2016

(65) Prior Publication Data

US 2016/0370929 A1    Dec. 22, 2016

(30) Foreign Application Priority Data

Jun. 22, 2015    (JP) .................................. 2015-125156

(51) Int. Cl.
   *G06F 3/14*    (2006.01)
   *G06F 3/041*    (2006.01)
   (Continued)

(52) U.S. Cl.
   CPC ............ *G06F 3/0416* (2013.01); *G06F 3/044* (2013.01); *G06F 3/045* (2013.01); *G06F 3/0414* (2013.01);
   (Continued)

(58) Field of Classification Search
   CPC ...... G06F 3/1415; G06F 3/1423–3/147; G06F 3/04886; G06F 3/041–3/047; G06F 2003/04803; G06F 1/1647; G09G 5/12; G09G 2300/023; G09G 2300/026; G09G 2340/04; G09G 2360/06; G09G 2360/122;
   (Continued)

(56) References Cited

U.S. PATENT DOCUMENTS

2010/0299436 A1\* 11/2010 Khalid .................. G06F 1/1643
                                                                709/226
2011/0006971 A1    1/2011 Ebey et al.
(Continued)

FOREIGN PATENT DOCUMENTS

JP    2011-150737 A    8/2011

OTHER PUBLICATIONS

Extended European Search Report dated Nov. 7, 2016, issued by the European Patent Office in corresponding European Application No. 16174347.1. (7 pages).

*Primary Examiner* — Roberto Flores
(74) *Attorney, Agent, or Firm* — Buchanan Ingersoll & Rooney PC

(57) ABSTRACT

An operation display system with a plurality of operation display devices each having a touch panel includes: a load criteria acquiring unit configured to acquire load criteria serving as criteria of pressing forces for the touch panels to accept an operation; an operation type acquiring unit configured to acquire types of operations to be performed on the touch panels with respect to objects displayed on screens of the operation display devices; and a control unit configured to control display on the screens of first and second operation display devices of the plurality of operation display devices in accordance with a result of comparison between the load criteria and the acquired types, the first and second operation display devices being in a cooperating state.

15 Claims, 12 Drawing Sheets

(51) Int. Cl.
  *H04N 1/00* (2006.01)
  *G06F 3/044* (2006.01)
  *G06F 3/045* (2006.01)
  *G06F 3/0484* (2013.01)
  *G06F 3/0488* (2013.01)
  *G09G 5/12* (2006.01)

(52) U.S. Cl.
  CPC ...... *G06F 3/04845* (2013.01); *G06F 3/04883* (2013.01); *G06F 3/1423* (2013.01); *G06F 3/1454* (2013.01); *G09G 5/12* (2013.01); *H04N 1/00129* (2013.01); *H04N 1/00307* (2013.01); *H04N 1/00411* (2013.01); *H04N 1/00442* (2013.01); *H04N 1/00474* (2013.01); *H04N 1/00493* (2013.01); *H04N 1/00503* (2013.01); *H04N 1/00506* (2013.01); *G09G 2300/026* (2013.01); *H04N 2201/001* (2013.01); *H04N 2201/0072* (2013.01); *H04N 2201/0075* (2013.01); *H04N 2201/0094* (2013.01)

(58) Field of Classification Search
  CPC .......... G02F 1/13336; H04M 2250/06; H04N 1/00442
  USPC ......................................................... 345/173
  See application file for complete search history.

(56) References Cited

U.S. PATENT DOCUMENTS

| | | | | |
|---|---|---|---|---|
| 2011/0057903 | A1* | 3/2011 | Yamano | G06F 3/0237 345/174 |
| 2011/0169765 | A1* | 7/2011 | Aono | G06F 3/016 345/173 |
| 2011/0181538 | A1 | 7/2011 | Aono | |
| 2012/0040719 | A1* | 2/2012 | Lee | G06F 1/1626 455/557 |
| 2012/0075236 | A1* | 3/2012 | Kim | G06F 3/041 345/174 |
| 2012/0081277 | A1* | 4/2012 | de Paz | G06F 1/1616 345/156 |
| 2012/0154328 | A1* | 6/2012 | Kono | G06F 3/016 345/174 |
| 2012/0206386 | A1* | 8/2012 | Xu | G06F 1/1616 345/173 |
| 2012/0218191 | A1 | 8/2012 | Huang et al. | |
| 2012/0290946 | A1* | 11/2012 | Schrock | G06Q 10/107 715/752 |
| 2013/0016056 | A1 | 1/2013 | Shinozaki et al. | |
| 2013/0321329 | A1* | 12/2013 | Tokutake | G06F 3/0412 345/174 |
| 2014/0049483 | A1* | 2/2014 | Kim | G06F 3/0488 345/173 |
| 2014/0078088 | A1* | 3/2014 | Seo | G06F 1/1626 345/173 |
| 2014/0101577 | A1* | 4/2014 | Kwak | G06F 1/1618 715/761 |
| 2015/0067560 | A1* | 3/2015 | Cieplinski | G06F 3/04842 715/765 |
| 2015/0097757 | A1* | 4/2015 | Bang | G06F 3/1454 345/2.2 |
| 2015/0212647 | A1* | 7/2015 | Kim | G02B 27/017 345/173 |
| 2017/0220172 | A1* | 8/2017 | Yamano | G06F 3/0414 |

* cited by examiner

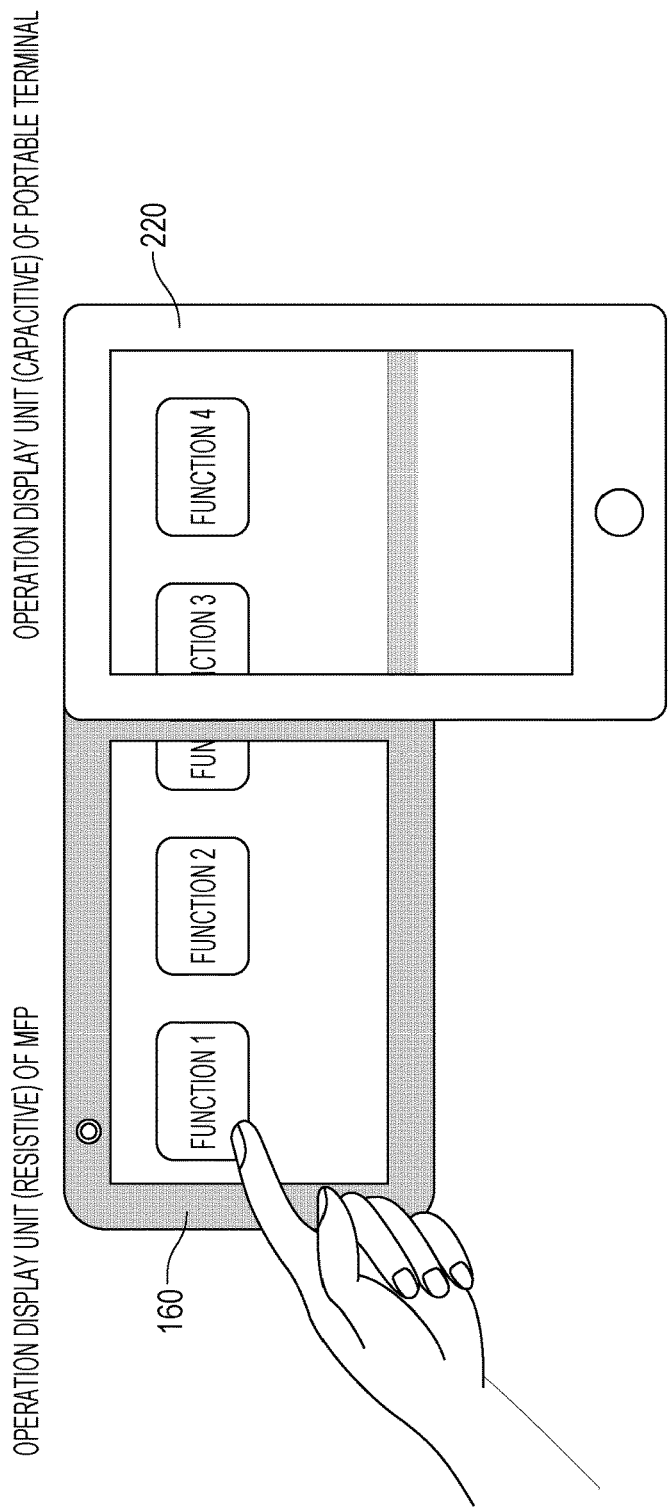

OPERATION DISPLAY SYSTEM, OPERATION DISPLAY DEVICE, AND OPERATION DISPLAY PROGRAM

The entire disclosure of Japanese Patent Application No. 2015-125156 filed on Jun. 22, 2015 including description, claims, drawings, and abstract are incorporated herein by reference in its entirety.

BACKGROUND OF THE INVENTION

Field of the Invention

The present invention relates to an operation display system, an operation display device, and an operation display program.

Description of the Related Art

Electronic devices equipped with touch panels, such as portable telephone terminals including smartphones, and MFPs (MultiFunction Peripherals), are being widely used these days. A touch panel is normally formed by integrating a display device such as a liquid crystal display with an input device such as a touch pad. In a case where a user inputs information through a touch panel displaying image objects such an icon and a button on its screen, for example, the user can select the icon or the button to input information by touching the icon or the button with a finger or a stylus. Further, more sophisticated touch panels have been developed. Such a touch panel can accept various kinds of input operations that are conducted not only by simply touching the screen with a finger but also by an action of lightly flicking the screen with a finger while the finger remains in contact with the screen (flicking), or an action of sliding a finger on the screen while the finger remains in contact with the screen (swiping), for example.

Meanwhile, the quantities and the number of types of information to be displayed on touch panels have been increasing, as the electronic devices have been becoming more and more sophisticated. However, the size of the screen of a single touch panel is limited, and in some cases, necessary information cannot be displayed at once. In such a case, the user can see the hidden portions by scrolling the displayed content vertically or horizontally on the screen. However, since the size of the screen the user can see at once is still limited, the portions that have been visible become now hidden, and this causes the user inconvenience.

On the other hand, there is a well-known technique for displaying image objects related to one another over multiple touch panels (this technique will be hereinafter referred to as "cooperative display"). By this technique, electronic devices having touch panels are made to cooperate, and the touch panels thereof form one large screen. By using such a technique, image objects can be displayed on a larger screen formed with multiple touch panels. On the touch panels performing cooperative display, the user can operate these touch panels in the same manner as in a case where the user is operating a single touch panel (this operation will be hereinafter referred to as a "cooperative operation").

Among the touch panels of electronic devices currently available on the market, however, there exist several systems depending on operating principles. The criteria of the pressing forces for the touch panels to accept operations may vary with the systems (the criteria will be hereinafter referred to as "load criteria"). Examples of touch panels of principal types include resistive touch panels and capacitive touch panels. A resistive touch panel has a higher load criterion than that of a capacitive touch panel, and requires a greater pressing force for an input than a capacitive touch panel does. In view of this, when performing a flick operation or a swipe operation, for example, the user normally finds it easy to operate a touch panel having a low load criterion, because such a touch panel can be operated with a small pressing force. On the other hand, the user might find it difficult to operate a touch panel having a high load criterion.

In this regard, a technique disclosed in JP 2011-150737 A has been known as a technique for improving the operability of touch panels. JP 2011-150737 A discloses a technique for preventing incorrect touch panel operations by setting different load criteria for image objects adjacent to each other. With such a technique, improvement of the operability of each touch panel can be expected.

However, even if the operability of each touch panel is improved by using the technique disclosed in JP 2011-150737 A, the user still finds it difficult to operate touch panels having different levels of operability when multiple electronic devices are made to cooperate. For example, in a case where electronic devices having touch panels with different load criteria are made to cooperate, the operability varies between an electronic device having a touch panel with a high load criterion and an electronic device having a touch panel with a low load criterion. As a result, the touch panels do not function as intended by the user, and the user might find it burdensome.

For example, in a case where two operation display devices with different load criteria are used, and the user performs a flick operation on the touch panel having the higher load criterion after performing a flick operation on the touch panel having the lower load criterion, the user might feel that the operability of the touch panels has rapidly dropped.

SUMMARY OF THE INVENTION

The present invention has been made in view of the above problems. Therefore, an object of the present invention is to provide an operation display system, an operation display device, and an operation display program that can prevent deterioration of the operability of touch panels due to a difference in load criterion between operation display devices.

The abovementioned object of the present invention is achieved by the following.

(1) To achieve the abovementioned object, according to an aspect, an operation display system with a plurality of operation display devices each having a touch panel, reflecting one aspect of the present invention comprises: a processor configured to; acquire load criteria serving as criteria of pressing forces for the touch panels to accept an operation, acquire types of operations to be performed on the touch panels with respect to objects displayed on screens of the operation display devices, and control display on the screens of first and second operation display devices of the plurality of operation display devices in accordance with a result of comparison between the load criteria and the acquired types, the first and second operation display devices being in a cooperating state.

(2) The operation display system according to Item. 1, wherein the processor preferably performs control to determine on which one of the first and second operation display devices each object is to be displayed, in accordance with the comparison result and the types.

(3) The operation display system according to Item. 1 or 2, wherein the processor preferably performs control to determine on which one of the first and second operation display devices each object is to be displayed, depending on whether the object is compatible with a moving operation that is performed by touching a portion of the object and moving the touched portion.

(4) The operation display system according to any one of Items. 1 to 3, wherein the processor preferably performs control to have an object preferentially displayed on the operation display device having the lower load criterion between the first and second operation display devices, the object being compatible with a moving operation that is performed by touching a portion of the object and moving the touched portion.

(5) The operation display system according to Item. 1, wherein, when the load criterion of the first operation display device differs from the load criterion of the second operation display device, the processor preferably exchanges entire display areas between the first operation display device and the second operation display device.

(6) The operation display system according to Item. 1, wherein, when the load criterion of the first operation display device differs from the load criterion of the second operation display device, the processor preferably exchanges a display area including an object compatible with a moving operation for a display area not including any object compatible with the moving operation between the first operation display device and the second operation display device, the moving operation being performed by touching a portion of the object and moving the touched portion.

(7) The operation display system according to any one of Items. 1 to 4, wherein, when the load criterion of the first operation display device differs from the load criterion of the second operation display device, the processor preferably exchanges an object compatible with a moving operation for an object not compatible with the moving operation between the first operation display device and the second operation display device, the moving operation being performed by touching a portion of the object and moving the touched portion.

(8) The operation display system according to any one of Items. 3, 4, 6, and 7, wherein the moving operation is preferably at least one of a drag operation, a flick operation, a swipe operation, a rotation operation, a pinch-in operation, and a pinch-out operation.

(9) The operation display system according to any one of Items. 1 to 8, wherein the processor is preferably included in one of the first and second operation display devices.

(10) The operation display system according to any one of Items. 1 to 9, wherein the first operation display device preferably has a capacitive touch panel, the second operation display device preferably has a resistive touch panel, and the capacitive touch panel preferably has a lower load criterion than the resistive touch panel.

(11) To achieve the abovementioned object, according to an aspect, an operation display device having a touch panel reflecting one aspect of the present invention comprises: a processor configured to; acquire a first load criterion serving as a criterion of a pressing force for the touch panel to accept an operation, and a second load criterion serving as a criterion of a pressing force for a touch panel of other operation display device to accept an operation, the other operation display device cooperating with the operation display device, acquire types of operations to be performed on the touch panel with respect to objects displayed on screens of the operation display device and the other operation display device, and control display on the screens of the operation display device and the other operation display device in accordance with a result of comparison between the first load criterion and the second load criterion and the acquired types.

(12) The operation display device according to Item. 11, wherein the processor preferably performs control to have an object preferentially displayed on the operation display device having the lower load criterion between the operation display device and the other operation display device, the object being compatible with a moving operation that is performed by touching a portion of the object and moving the touched portion.

(13) The operation display device according to Item. 12, wherein the moving operation is preferably at least one of a drag operation, a flick operation, a swipe operation, a rotation operation, a pinch-in operation, and a pinch-out operation.

(14) To achieve the abovementioned object, according to an aspect, a non-transitory recording medium storing a computer readable operation display program for controlling an operation display system including a plurality of operation display devices each having a touch panel, reflecting one aspect of the present invention causes a computer to carry out: acquiring load criteria serving as criteria of pressing forces for the touch panels to accept an operation; acquiring types of operations to be performed on the touch panels with respect to objects displayed on screens of the operation display devices; and controlling display on the screens of first and second operation display devices of the plurality of operation display devices in accordance with a result of comparison between the load criteria and the acquired types, the first and second operation display devices being in a cooperating state.

(15) The non-transitory recording medium storing a computer readable operation display program according to Item. 14, wherein when controlling display on the screens of first and second operation display devices of the plurality of operation display devices, control to have an object preferentially displayed on the operation display device having the lower load criterion between the first and second operation display devices is preferably performed, the object being compatible with a moving operation that is performed by touching a portion of the object and moving the touched portion.

(16) The non-transitory recording medium storing a computer readable operation display program according to Item. 15, wherein the moving operation is preferably at least one of a drag operation, a flick operation, a swipe operation, a rotation operation, a pinch-in operation, and a pinch-out operation.

(17) To achieve the abovementioned object, according to an aspect, a non-transitory recording medium storing a computer readable operation display program for controlling an operation display device having a touch panel, reflecting one aspect of the present invention causes a computer to carry out: acquiring a first load criterion serving as a criterion of a pressing force for the touch panel to accept an operation, and a second load criterion serving as a criterion of a pressing force for a touch panel of other operation display device to accept an operation, the other operation display device cooperating with the operation display device; acquiring types of operations to be performed on the touch panels with respect to objects displayed on screens of the operation display device and the other operation display device; and controlling display on the screens of the operation display device and the other operation display device in accordance with a result of comparison between the first load criterion and the second load criterion and the acquired types.

(18) The non-transitory recording medium storing a computer readable operation display program according to Item. 17, wherein when controlling display on the screens of the operation display device and the other operation display device, control to have an object preferentially displayed on the operation display device having the lower load criterion between the operation display device and the other operation display device is preferably performed, the object being compatible with a moving operation that is performed by touching a portion of the object and moving the touched portion.

(19) The non-transitory recording medium storing a computer readable operation display program according to Item. 18, wherein the moving operation is preferably at least one of a drag operation, a flick operation, a swipe operation, a rotation operation, a pinch-in operation, and a pinch-out operation.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a schematic view for explaining cooperation between operation display devices in an operation display system of an embodiment of the present invention;

DESCRIPTION OF THE PREFERRED EMBODIMENTS

Figure 1:
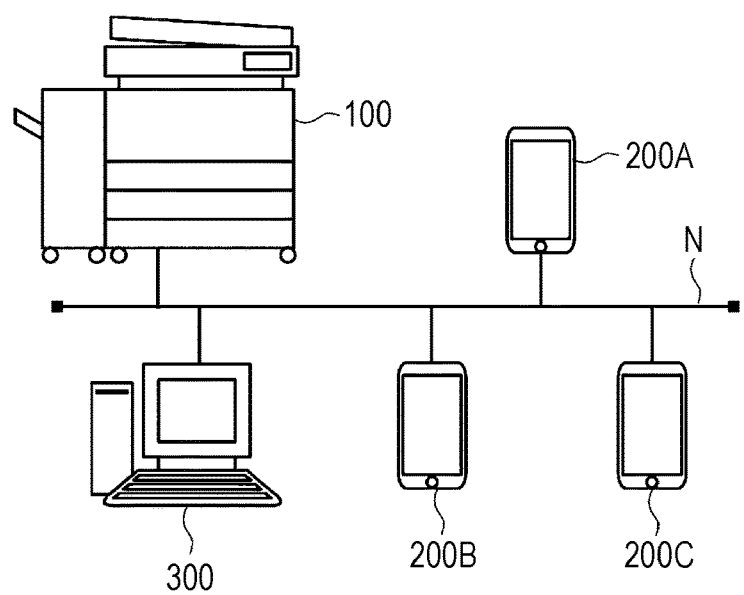
FIG. 1 is a schematic view for explaining the configuration of an operation display system according to an embodiment of the present invention.

Hereinafter, an operation display system, an operation display device, and an operation display program according to an embodiment of the present invention will be described with reference to the drawings. However, the scope of the invention is not limited to the illustrated examples. In the drawings, like components are denoted by like reference numerals.

(Embodiment)

<Configuration of an Operation Display System>

Figure 2:
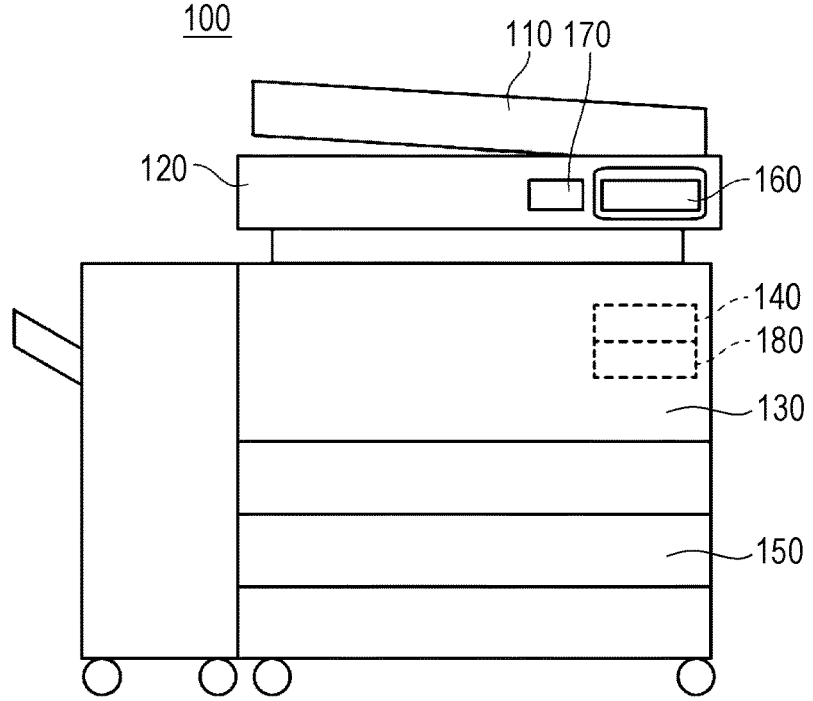
FIG. 2 is a side view for roughly explaining the structure of the image forming apparatus shown in FIG. 1.
Figure 3:
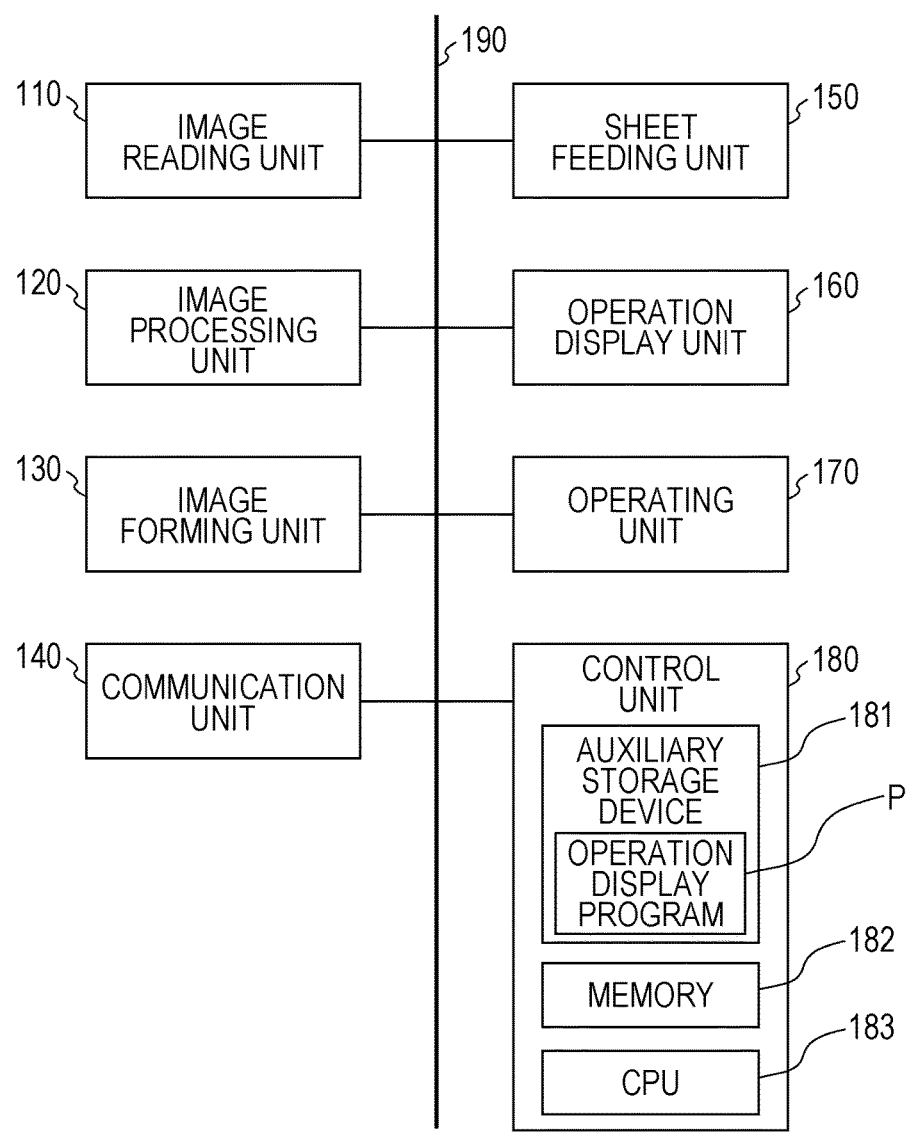
FIG. 3 is a block diagram for roughly explaining the structure of the image forming apparatus shown in FIG. 1.

FIG. 1 is a schematic view for explaining the configuration of an operation display system according to an embodiment. FIGS. 2 and 3 are a side view and a block diagram, respectively, for roughly explaining the structure of the image forming apparatus shown in FIG. 1.

As shown in FIG. 1, an operation display system 400 includes an image forming apparatus 100, portable terminal devices 200A, 200B, and 200C, and a server 300. These components are connected to an access point, and are designed to be able to communicate with one another via a network N. Alternatively, any access point or network may not be used, and the components may be connected directly to one another. Also, the components may be connected wirelessly to one another, or may be connected to one another with wires.

The image forming apparatus 100 of this embodiment is an MFP, a printer, or a facsimile machine, for example. In the example case described below, the image forming apparatus 100 is an MFP. The portable terminal devices 200A, 200B, and 200C may be portable telephone terminals, such as smartphones, or portable information terminals, such as PDAs (Personal Digital Assistants). In this specification, portable terminal devices will be hereinafter referred to as "portable terminals", for ease of explanation.

In the example case shown in FIG. 1, one MFP, three portable terminals, and one server are connected to the network N. However, the numbers of MFPs, portable terminals, and servers are not limited to them. Also, some of the above components may not be provided, or some other component may be added.

The network N is a local area network (LAN) that connects computers and network devices to one another in accordance with the standards, such as Ethernet (a registered trade name), Token-Ring, or FDDI (Fiber-Distributed Data Interface), a wide area network (WAN) that connects LANs to one another with special-purpose lines, the Internet, or a combination of those networks. The network protocol is TCP/IP (Transmission Control Protocol/Internet Protocol), for example.

<Structure of the MFP>

As shown in FIGS. 2 and 3, the MFP 100 includes an image reading unit 110, an image processing unit 120, an image forming unit 130, a communication unit 140, a sheet feeding unit 150, an operation display unit 160, an operating unit 170, and a control unit 180. These components are connected to one another with an internal connection line 190. In this embodiment, the MFP 100 functions as an operation display device.

The image reading unit 110 optically reads an original, and generates an image data signal. The image reading unit 110 includes a light source, an optical system, an image sensor, and an analog-digital converter circuit. In the image reading unit 110, the light source sequentially emits light in the respective colors R, G, and B to the original. The optical system includes mirrors and an imaging lens, and light reflected from the original forms an image on the image sensor through the mirrors and the imaging lens of the optical system. The image sensor reads the reflected light corresponding to the respective colors R, G, and B from each line, and generates an electrical signal in accordance with the intensity of the light reflected from the original. The electrical signal generated as above is converted from an analog signal to a digital signal at the analog-digital converter circuit, and is transmitted as the image data signal to the image processing unit 120.

The image processing unit 120 performs various kinds of image processing on the image data signal, to generate print image data. The image processing includes shading correction, γ correction, line interval correction, color shift correction, an enlarging/reducing process, and a color conversion process, for example.

The image forming unit 130 forms an image based on the print image data by an electrophotographic process, and fixes the formed image onto a paper sheet serving as a recording medium. More specifically, the image forming unit 130 electrically charges a photosensitive member with a charger, and illuminates the photosensitive member with light from a light emitting device, such as a laser or a light emitting diode (LED), in accordance with the print image data. By doing so, the image forming unit 130 forms an electrostatic latent image. The print image data is generated by the image processing unit 120, or is generated by rasterizing a print job received by the communication unit 140. The image forming unit 130 applies toner to the electrostatic latent image on the photosensitive member, and transfers the electrostatic latent image onto a paper sheet. The paper sheet is supplied by the sheet feeding unit 150, and is conveyed to the image forming unit 130 by a sheet conveying unit. The paper sheet having the image transferred thereonto is conveyed to a fixing device by a conveyance belt, and the toner transferred onto the paper sheet is heated and pressed. As a result, the toner adheres to the paper sheet. The paper sheet having the toner adhering thereto and the image formed thereon is discharged from a sheet discharge tray to the outside.

The communication unit 140 is an interface for communicating with other devices, such as the portable terminals 200A, 200B, and 200C, and the server 300, via the network N. For communication, standards, such as LTE (Long Term Evolution), W-CDMA (Wideband Code Division Multiple Access), Ethernet (a registered trade name), Wi-Fi, FDDI, or Token-Ring, are used. The communication unit 140 has a near field communication function compliant with Bluetooth (a registered trade name), for example, and is capable of exchanging image data and the like with the portable terminals 200A, 200B, and 200C. The communication unit 140, together with the control unit 180, functions as a load criteria acquiring unit and an operation type acquiring unit.

The sheet feeding unit 150 includes at least one sheet feeder tray, and supplies paper sheets one by one to the image forming unit 130.

The operation display unit 160 accepts various kinds of inputs from the user, and displays information, such as settings, processing results, warnings, and messages. The operation display unit 160 has a touch panel including a touch pad and a display device, and is capable of accepting inputs while displaying information. The touch panel may be a resistive touch panel, a capacitive touch panel, a surface acoustic wave touch panel, an infrared touch panel, an electromagnetic inductive touch panel, a load sensing touch panel, or the like. In the example case described below, the operation display unit 160 has a resistive touch panel. The display device is provided on the back surface of the touch pad, and may include a liquid crystal display, an organic light-emitting display, or the like.

When inputting information to the operation display unit 160, the user touches an object displayed on the screen of the operation display unit 160 with a finger or a stylus, and selects the object to input information. In this specification, the user touching the touch panel with a pressing force to be accepted as an input by the touch panel will be hereinafter referred to as "touching". The object may be an icon, a button, an image, or a background image shown as the background of icons and buttons, for example. In this specification, an object that can accept an input operation will be hereinafter referred to as an "operation object".

The user can not only input information simply by touching the screen with a finger, but also move the object while keeping the finger in contact with the screen, for example. In this manner, the user can input information to the operation display unit 160 by using various motions (gestures) with a finger. The operation display unit 160 of this embodiment can accept operations such as a touch (push) operation, a tap operation, a double-tap operation, a triple-tap operation, a long-tap operation, a drag operation, a flick operation, a swipe operation, a pinch-in operation, a pinch-out operation, and a rotation operation, though input operations are not limited to the above. In this specification, among the above operations, operations for moving a touch portion after touching the portion, such as a drag operation, a flick operation, a swipe operation, a pinch-in operation, a pinch-out operation, and a rotation operation, will be hereinafter referred to as "moving operations", for ease of explanation. The moving operations exclude touch operations, tap operations, double-tap operations, triple-tap operations, and long-tap operations. Of the moving operations, operations for simultaneously touching multiple portions on a touch panel and moving the portions, such as a pinch-in operation and a pinch-out operation, will be hereinafter referred to as "multiple touch operations". The moving operations are input operations that normally involve more complicated motions of a finger than a tap operation, a double-tap operation, a triple-tap operation, and a long-tap operation.

The operating unit 170 includes push-button switches and a keyboard, for example, and accepts various inputs from the user.

The control unit 180 controls the image reading unit 110, the image processing unit 120, the image forming unit 130, the communication unit 140, the sheet feeding unit 150, the operation display unit 160, and the operating unit 170.

As shown in FIG. 3, the control unit 180 includes an auxiliary storage device 181, a memory 182, and a CPU 183.

The auxiliary storage device 181 is a large-capacity storage device, such as a hard disk drive or a solid-state drive. Various software programs such as an operating system and an operation display program P are stored in the auxiliary storage device 181. As will be described later, the operation display program P is a software program for implementing an operation display method of this embodiment. The operation display program P may be installed beforehand into the auxiliary storage device 181, or may be downloaded from the server 300 as necessary.

The memory 182 includes memory devices such as a RAM (Random Access Memory) and a flash ROM (Read Only Memory). The above mentioned various software programs are temporarily stored into the RAM when executed by the CPU 183. Results of determinations and calculations performed by the CPU 183 are also stored in the RAM. The flash ROM stores various settings such as the load criterion for the touch panel of the operation display unit 160, object operation types, conditions for determining a cooperating state, and a unit for exchanging display content.

The load criterion is a criterion of the pressing force for the touch panel to determine whether to accept an operation. When the touch panel is pressed with a greater pressing force than the criterion, the touch panel accepts the input. When the touch panel is pressed with a smaller pressing force than the criterion, the touch panel does not accept the input. Load criteria according to this embodiment are preferably normalized so that comparison can be performed under the same conditions between touch panels of different types.

The object operation types are types related to touch panel operations for the respective objects displayed on the operation display unit 160. The object operation types include a tap operation and a flick operation, for example. If a flick operation is included in the object operation types, a flick operation can be performed on the object.

The conditions for determining a cooperating state are the conditions for determining that operation display devices are in a cooperating state. These conditions may be (1) cooperative display and a cooperative operation or (2) cooperative display or a cooperative operation.

The unit for exchanging display content is the unit for exchanging the content displayed on the screen between two operation display devices. The unit may be (1) the entire display area, (2) part of the display area, or (3) objects.

The load criterion, the object operation types, the conditions for determining a cooperating state, and the unit for exchanging display content can be set by the manager via a menu.

In this embodiment, the control unit 180 acquires the load criteria for the touch panels of the MFP 100 and the portable terminal cooperating with the MFP 100, and then compares the two load criteria. In accordance with a result of the load criteria comparison and the object operation types displayed on the MFP 100 and the portable terminal, the control unit 180 controls display on the screens of the MFP 100 and the portable terminal. More specifically, in accordance with the comparison result and the operation types, the control unit 180 performs control to determine on which one of the MFP 100 and the portable terminal movable objects are to be displayed. The control unit 180 also performs control so that an object of a movable operation type is preferentially displayed on an operation display device that is the MFP 100 or the portable terminal, whichever has the lower load criterion.

<Structure of a Portable Terminal>

Figure 4:
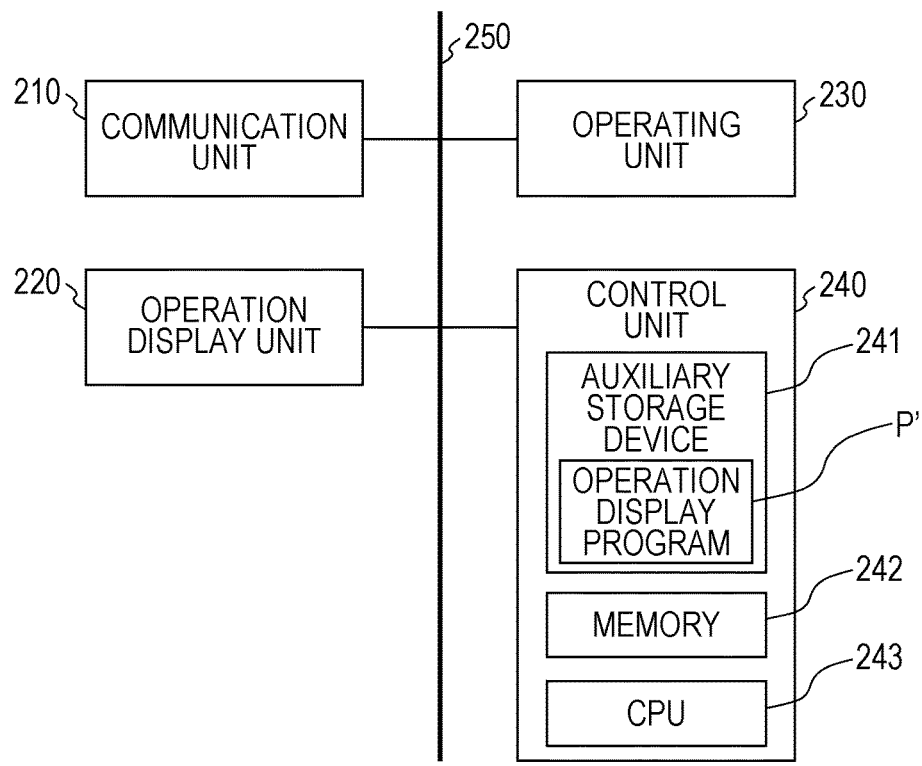
FIG. 4 is a block diagram for roughly explaining the structure of each portable terminal shown in FIG. 1.

Referring now to FIG. 4, the structures of the portable terminals 200A, 200S, and 200C are roughly described. FIG. 4 is a block diagram for roughly explaining the structure of each portable terminal shown in FIG. 1. Since the portable terminals 200A, 200B, and 200C have the same structures, only the structure of the portable terminal 200A will be described below, and the structures of the portable terminals 200B and 200C will not be described to avoid repetitions.

The portable terminal 200A includes a communication unit 210, an operation display unit 220, an operating unit 230, and a control unit 240. In this embodiment, the portable terminal 200A functions as an operation display device.

The communication unit 210 is an interface for communicating with other devices, such as the MFP 100 and the server 300, via the network N. In communication, standards, such as LTE, W-CDMA, Ethernet (a registered trade name), Wi-Fi, FDDI, or Token-Ring, are used. The communication unit 210 has a near field communication function compliant with Bluetooth (a registered trade name), for example, and is capable of exchanging image data and the like with the MFP 100. The communication unit 210, together with the control unit 240, functions as a load criteria acquiring unit and an operation type acquiring unit.

The operation display unit 220 accepts various kinds of inputs from the user, and displays information, such as settings, processing results, warnings, and messages. The operation display unit 220 has a touch panel including a touch pad and a display device, and is capable of accepting inputs while displaying information. The touch panel may be a resistive touch panel, a capacitive touch panel, a surface acoustic wave touch panel, an infrared touch panel, an electromagnetic inductive touch panel, a load sensing touch panel, or the like. In the example case described below, the portable terminal 200A has a capacitive touch panel. The display device is provided on the back surface of the touch pad, and may include a liquid crystal display, an organic light-emitting display, or the like. In this embodiment, the size of the touch panel screen of the operation display unit 220 is the same as the size of the touch panel screen of the operation display unit 160.

The operating unit 230 includes push-button switches and a keyboard, for example, and accepts various inputs from the user.

The control unit 240 controls the communication unit 210, the operation display unit 220, and the operating unit 230. As shown in FIG. 4, the control unit 240 includes an auxiliary storage device 241, a memory 242, and a CPU 243.

Various software programs such as an operating system and an operation display program P' are stored in the auxiliary storage device 241. As will be described later, the operation display program P' is a software program for implementing the operation display method of this embodiment. The operation display program P' includes a program for cooperating with another operation display device, a program for acquiring a load criterion and transmitting it to another operation display device, and the like. The operation display program P' may be installed beforehand into the auxiliary storage device 241, or may be downloaded from the server 300 as necessary.

The memory 242 has the same structure as the memory 182 of the MFP 100, and therefore, a detailed explanation is not provided herein to avoid repetitions.

<Cooperation Between Operation Display Devices>

Referring now to FIG. 5, cooperation between operation display devices of this embodiment is described. FIG. 5 is a schematic view for explaining cooperation between operation display devices in the operation display system of this embodiment.

In this embodiment, when the distance between the MFP 100 and the portable terminal 200A is equal to or shorter than a predetermined distance, the MFP 100 and the portable terminal 200A starts cooperating.

When the cooperation starts, the control unit 180 and the control unit 240 cooperate with each other, and exchange display data and control signals via the communication unit 140 and the communication unit 210. In a case where the portable terminal 200A is placed on the right side of the MFP 100, for example, the control unit 180 and the control unit 240 perform control so that objects related to one other are successively displayed from the operation display unit 160 to the operation display unit 220. In the example shown in FIG. 5, the operation display unit 160 and the operation display unit 220 form one large screen, and display the operation objects (buttons) for "function 1" through "function 4", which are part of the menu screen.

When the user performs an operation by touching the menu screen, the operation display unit 160 and the operation display unit 220 cooperate to process the user's screen operation. Thus, the user can operate the operation display unit 160 and the operation display unit 220 as if they were one operation display unit. For example, when the user scrolls the display content to the right on the operation display unit 160 by a swipe operation or the like, the display content on the operation display unit 220 is also scrolled to the right in synchronization. In this manner, the operation display unit 160 and the operation display unit 220 display objects in an integrated manner so that the display content on the operation display unit 160 and the display content on the operation display unit 220 move in synchronization in accordance with a screen operation.

If an operation object displayed on the two touch panels of the operation display unit 160 and the operation display unit 220 (the button for "function 3" in FIG. 5) is an object that can be subjected to a multi-touch operation, the user can perform a multi-touch operation on the object.

Although FIG. 5 shows an example case where the two operation display devices of the MFP 100 and the portable terminal 200A cooperate, the number of operation display devices that can cooperate in this embodiment is not limited to two.

Also, the above mentioned predetermined distance is not limited to any specific distance, but is preferably set at several centimeters, for example. However, the predetermined distance may be set at several meters or several tens of meters for the user's convenience.

Although FIG. 5 shows an example case where the two operation display devices of the MFP 100 and the portable terminal 200A cooperate in the horizontal direction in the drawing, the two operation display devices may cooperate in the vertical direction.

As described above, in a case where objects cannot be displayed at once on a single touch panel that has a limited screen size, operation display devices are made to cooperate. In this manner, a larger number of objects can be displayed and operated at once.

The following is a description of specific examples where the processing procedures according to an operation display method of this embodiment are carried out with the MFP 100 and the portable terminal 200A having the above described structures, with reference to FIGS. 6A through 6D and FIGS. 7 through 10. The operation display method of this embodiment is implemented by the CPUs 183 and 243 executing the above described operation display programs P and P', respectively. The operation display programs P and P' are designed for the MFP 100 and the portable terminal 200A to cooperate to implement the operation display method of this embodiment. As for the relationship between the two operation display programs P and P', the operation display program P may take a leading role, or the operation display program P' may take a leading role. In the example cases described below, the operation display program P takes a leading role.

<Outline of the Operation Display Method>

Figure 6A:
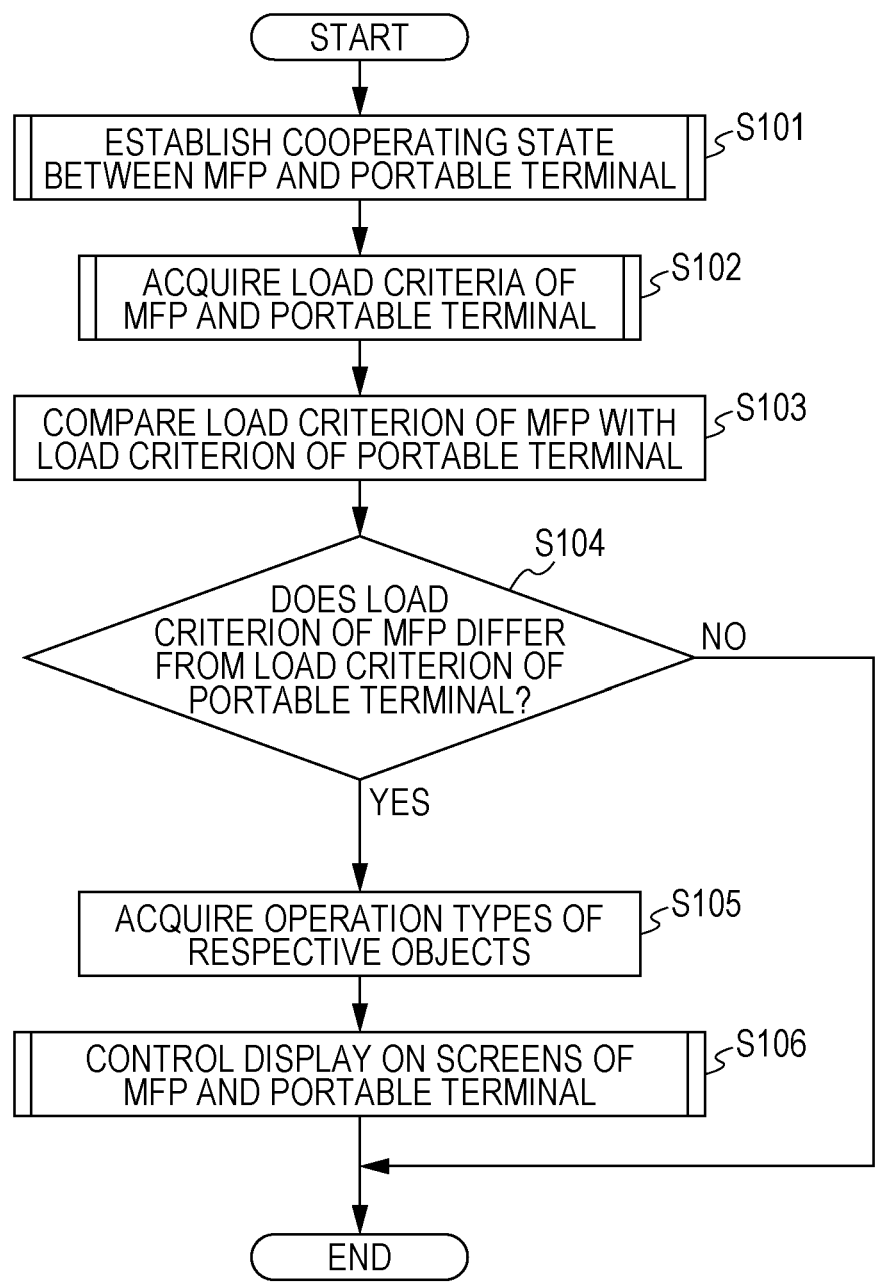
FIG. 6A is a flowchart for explaining an example of the processing procedures to be carried out on an MFP side according to an operation display method of an embodiment of the present invention.
Figure 6B:
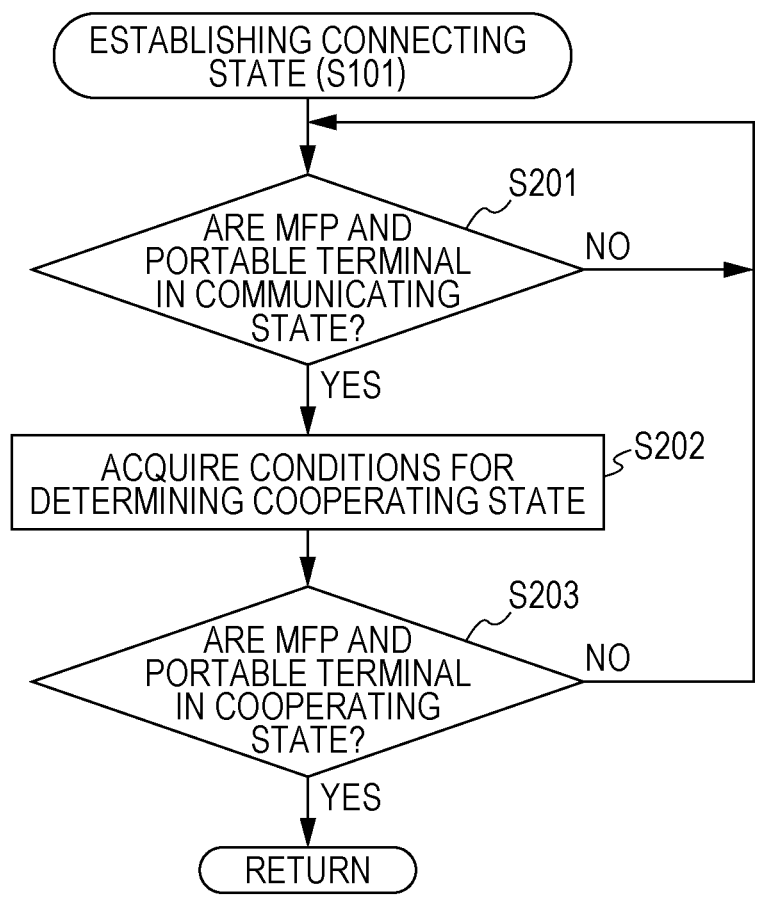
FIG. 6B is a subroutine flowchart for explaining the process (step S101) of establishing a cooperating state in FIG. 6A.
Figure 6C:
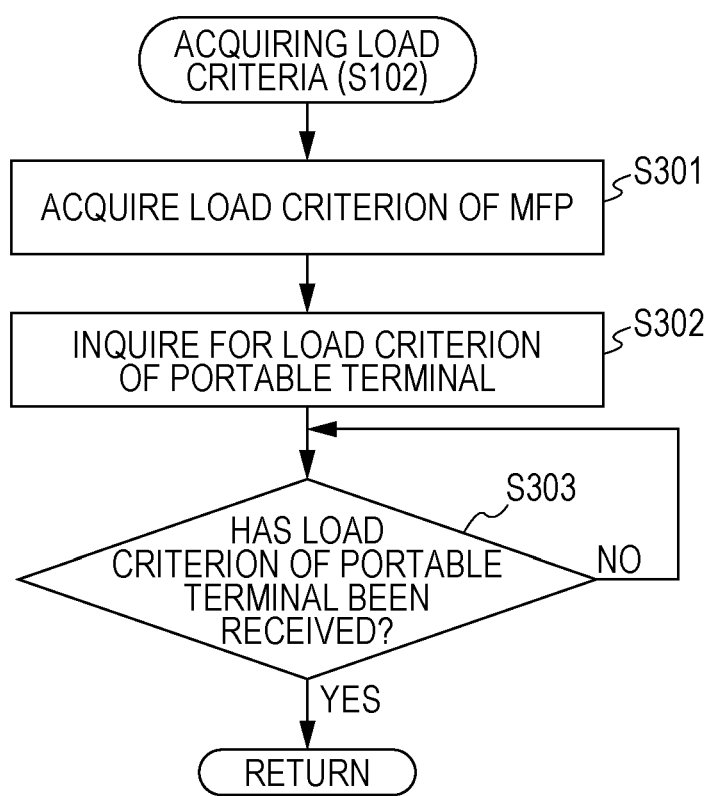
FIG. 6C is a subroutine flowchart for explaining the process (step S102) of acquiring load criteria in FIG. 6A.
Figure 6D:
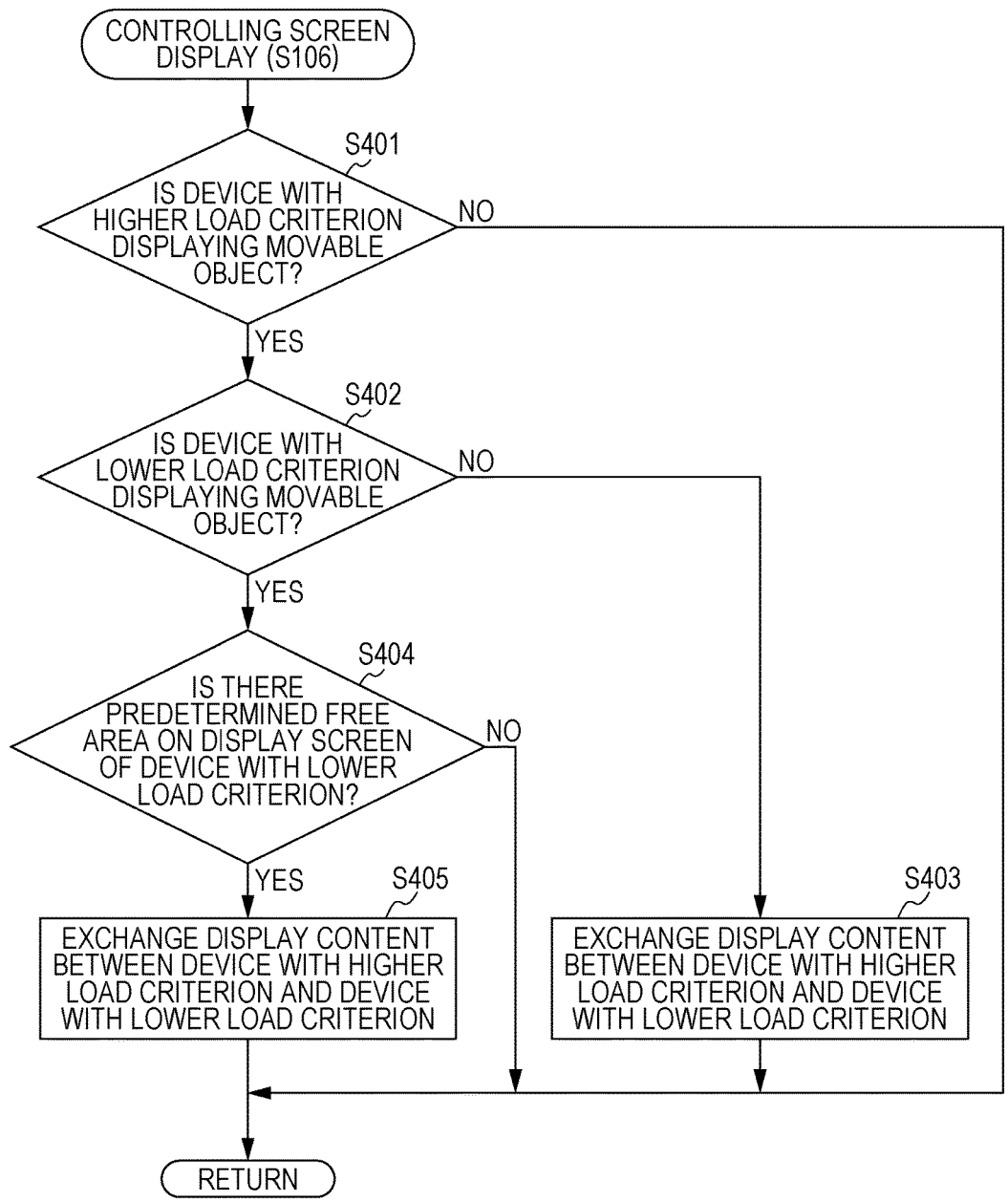
FIG. 6D is a subroutine flowchart for explaining the process (step S106) of controlling display on screens in FIG. 6A.

Referring now to FIGS. 6A through 6D, the processing procedures according to the operation display method of this embodiment are described. FIG. 6A is a flowchart for explaining an example of the processing procedures to be carried out by the MFP according to the operation display method of this embodiment. FIG. 6B is a subroutine flowchart for explaining the process (step S101) of establishing a cooperating state in the flowchart in FIG. 6A. FIG. 6C is a subroutine flowchart for explaining the process (step S102) of acquiring load criteria in the flowchart in FIG. 6A. FIG. 6D is a subroutine flowchart for explaining the process (step S106) of controlling display on the screens in the flowchart in FIG. 6A.

<Processing Procedures on the MFP Side>

As shown in FIG. 6A, a cooperating state is first established between the MFP 100 and the portable terminal 200A (step S101). For example, the user starts the operation display program P' by operating the portable terminal 200A, and places the portable terminal 200A near the operation display unit 160 of the MFP 100 so that the MFP 100 and the portable terminal 200A cooperate. The process of establishing a cooperating state will be described later in detail.

The load criteria of the MFP 100 and the portable terminal 200A are then acquired (step S102). The control unit 180 acquires the load criterion N1 for the touch panel of the operation display unit 160, and the load criterion N2 for the touch panel of the operation display unit 220. The process of acquiring the load criteria will be described later in detail.

The load criterion N1 of the MFP 100 is then compared with the load criterion N2 of the portable terminal 200A (step S103). The control unit 180 compares the load criterion N1 of the MFP 100 with the load criterion N2 of the portable terminal 200A, the load criteria having been acquired in step S102.

A check is then made to determine whether the load criterion N1 of the MFP 100 differs from the load criterion N2 of the portable terminal 200A (step S104). If the load criterion N1 of the MFP 100 does not differ from the load criterion N2 of the portable terminal 200A, or if the load criterion N1 and the load criterion N2 are the same (step S104: NO), the control unit 180 ends the process (END).

If the load criterion N1 differs from the load criterion N2 (step S104: YES), on the other hand, the respective object operation types are acquired (step S105). For each of the objects displayed on the operation display unit 160, the control unit 180 reads operation type information stored in the memory 182. For each of the objects displayed on the operation display unit 220, the control unit 240 reads operation type information stored in the memory 242, and transmits the operation type information to the MFP 100 through the communication unit 210. The control unit 180 then receives the operation type information about the respective objects displayed on the operation display unit 220, through the communication unit 140.

The display on the screens of the MFP 100 and the portable terminal 200A is then controlled (step S106). In accordance with a result of the load criteria comparison and the acquired operation types with respect to the MFP 100 and the portable terminal 200A in a cooperating state, the control unit 180 controls the display on the screens of the MFP 100 and the portable terminal 200A. The process of controlling the display on the screens will be described later in detail.

As described above, in the process according to the flowchart shown in FIG. 6A, the control unit 180 acquires the load criteria of the MFP 100 and the portable terminal 200A, and the operation types of the respective objects displayed on the screens of the MFP 100 and the portable terminal 200A. In accordance with a result of the load criteria comparison and the acquired operation types with respect to the MFP 100 and the portable terminal 200A, the control unit 180 controls the display on the screens of the MFP 100 and the portable terminal 200A.

<Process of Establishing a Cooperating State (Step S101)>

Referring now to FIG. 6B, the process of establishing a cooperating state is described. As shown in FIG. 6B, a check is first made to determine whether the MFP 100 and the portable terminal 200A are in a communicating state (step S201). The control unit 180 inquires of the communication unit 140 as to whether the MFP 100 and the portable terminal 200A are in a communicating state. If the MFP 100 and the portable terminal 200A are not in a communicating state (step S201: NO), the control unit 180 stands by until the MFP 100 and the portable terminal 200A are put into a communicating state.

If the MFP 100 and the portable terminal 200A are in a communicating state (step S201: YES), the conditions for determining a cooperating state are acquired (step S202). The control unit 180 acquires the conditions for determining a cooperating state by reading them out of the flash ROM of the memory 182.

A check is then made to determine whether the MFP 100 and the portable terminal 200A are in a cooperating state (step S202). In accordance with the conditions for determining a cooperating state, the control unit 180 determines whether the MFP 100 and the portable terminal 200A are in a cooperating state (step S203). If the MFP 100 and the portable terminal 200A are not in a cooperating state (step S203: NO), the control unit 180 returns to step S201. If the MFP 100 and the portable terminal 200A are in a cooperating state (step S203: YES), on the other hand, the control unit 180 ends the process of establishing a cooperating state, and then moves onto step S102 in FIG. 6A (RETURN).

<Process of Acquiring Load Criteria (Step S102)>

Referring now to FIG. 6C, the process of acquiring load criteria is described. As shown in FIG. 6C, the load criterion of the MFP 100 is first acquired (step S301). The control unit 180 acquires the load criterion N1 for the touch panel of the operation display unit 160 by reading it out of the flash ROM of the memory 182.

An inquiry is then made as to the load criterion of the portable terminal 200A (step S302). More specifically, the control unit 180 instructs the communication unit 140 to inquire of the control unit 240 for the information about the load criterion N2 for the touch panel of the operation display unit 220 of the portable terminal 200A. The communication unit 140 then inquires of the control unit 240 for the information about the load criterion N2. The process to be performed on the side of the portable terminal 200A from the reception of the inquiry for the information about the load criterion N2 till the transmission of the information about the load criterion N2 will be described later.

A check is then made to determine whether the load criterion N2 of the portable terminal 200A has been received (step S303). If the load criterion N2 of the portable terminal 200A has not been received (step 303: NO), the control unit 180 stands by until the load criterion N2 is received.

If the load criterion N2 of the portable terminal 200A has been received (step S303: YES), the other hand, the control unit 180 ends the process of acquiring load criteria, and then moves on to step S103 in FIG. 6A (RETURN).

<Process of Controlling Display on Screens (Step S106)>

Referring now to FIG. 6D, the process of controlling display on screens is described. As shown in FIG. 6D, a check is first made to determine whether the device having the higher load criterion is displaying an object that can be moved (or needs to be moved) (step S401). In a case where the load criterion N1 of the operation display unit 160 is higher than the load criterion N2 of the operation display unit 220, the control unit 180 determines whether the operation display unit 160 is displaying an object that can be moved. More specifically, the control unit 180 reads, from the memory 182, the operation types of the respective objects displayed on the operation display unit 160, and determines whether the objects include an object that can be moved.

In a case where the load criterion N1 is lower than the load criterion N2, on the other hand, the control unit 180 determines whether the operation display unit 220 is displaying an object that can be moved. More specifically, the control unit 240 reads, from the memory 242, the operation types of the respective objects displayed on the operation display unit 220, and determines whether the objects include an object that can be moved.

If the device having the higher load criterion is not displaying any display content that can be moved (step S401: NO), the control unit 180 ends the process of controlling display on screens (RETURN).

If the device having the higher load criterion is displaying an object that can be moved (step S401: YES), the other hand, a check is made to determine whether the device having the lower load criterion is displaying an object that can be moved (step S402). In a case where the load criterion N1 is higher than the load criterion N2, the control unit 180 determines whether the operation display unit 220 is displaying an object that can be moved. In a case where the load criterion N1 is lower than the load criterion N2, on the other hand, the control unit 180 determines whether the operation display unit 160 is displaying an object that can be moved.

If the device having the lower load criterion is not displaying any object that can be moved (step S402: NO), display content is exchanged between the device having the higher load criterion and the device having the lower load criterion (step S403). The control unit 180 exchanges the content displayed on the device having the higher load criterion and the content displayed on the device having the lower load criterion. In this embodiment, display content may be buttons, icons, an image, the entire display area (corresponding to the screen of each of the operation display units 160 and 220), or part of the display area. As for the unit for exchanging display content, the user can select (1) the entire display area, (2) part of the display area, or (3) objects, from the settings. The exchange of display content will be described later in detail.

If the device having the lower load criterion is displaying an object that can be moved (step S402: YES), on the other hand, a check is made to determine whether a free area of a predetermined size or larger exists on the display screen of the device having the lower load criterion (step S404). The free area is the area obtained by subtracting the area in which the object that can be moved is displayed from the entire display area of the device having the lower load criterion. If the device having the lower load criterion does not have any free area of the predetermined size or larger on its display screen (step S404: NO), the control unit 180 ends the process of controlling display on screens (RETURN).

If the device having the lower load criterion has a free area of the predetermined size or larger on its display screen (step S404: YES), display content is exchanged between the device having the higher load criterion and the device having the lower load criterion (step S405). The control unit 180 exchanges the content displayed on the device having the higher load criterion and the content displayed on the device having the lower load criterion. More specifically, the control unit 180 replaces the content displayed on the display having the lower load criterion with the movable content displayed on the device having the higher load criterion, by the amount equivalent to the free area.

<Processing Procedures on the Portable Terminal Side>

Figure 7:
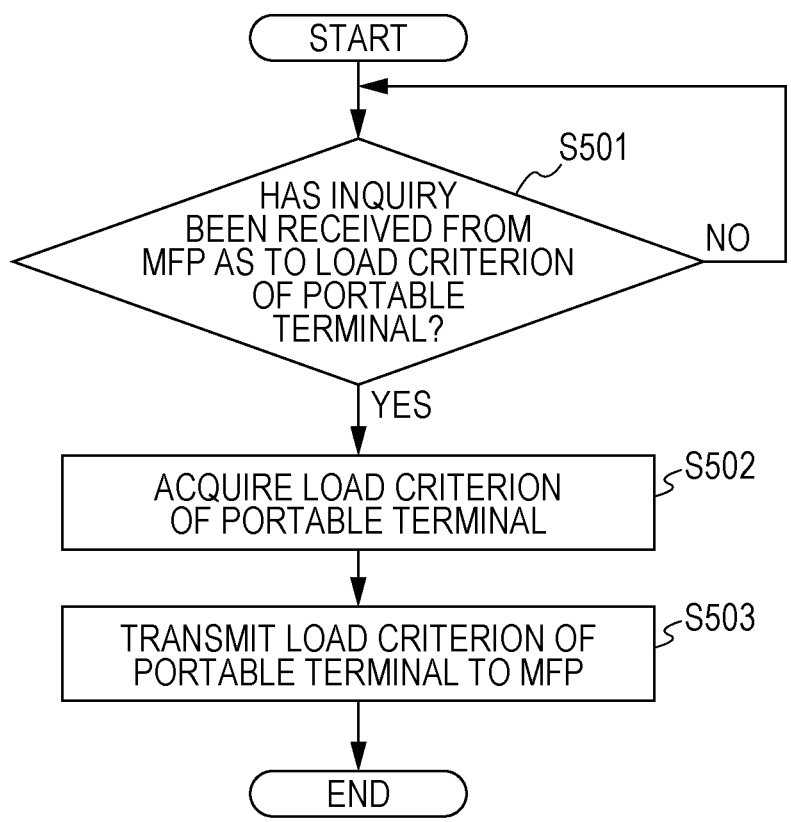
FIG. 7 is a flowchart for explaining an example of the processing procedures to be carried out on a portable terminal side according to the operation display method of an embodiment.

FIG. 7 is a flowchart for explaining an example of the processing procedures to be carried out on the portable terminal side according to the operation display method of this embodiment. As will be described below, on the side of the portable terminal 200A, the load criterion N2 of the portable terminal 200A is acquired in response to an inquiry from the MFP 100, and is then transmitted to the MFP 100.

As shown in FIG. 7, a check is first made to determine whether an inquiry has been received from the MFP 100 as to the load criterion N2 of the portable terminal 200A (step S501). If any inquiry has not been received from the MFP 100 as to the load criterion N2 of the portable terminal 200A (step S501: NO), the control unit 240 stands by until an inquiry is received from the MFP 100 as to the load criterion N2 of the portable terminal 200A.

If an inquiry has been received from the MFP 100 as to the load criterion N2 of the portable terminal 200A (step S501: YES), the other hand, the control unit 240 acquires the load criterion N2 of the portable terminal 200A (step S502). The control unit 240 acquires the load criterion N2 by reading it out of the flash ROM of the memory 242.

The load criterion N2 of the portable terminal 200A is then transmitted to the MFP 100 (step S503). The control unit 240 transmits the load criterion N2 of the portable terminal 200A to the MFP 100 through the communication unit 210, and then ends the process (END).

<Exchange of Display Content>

Figure 8:
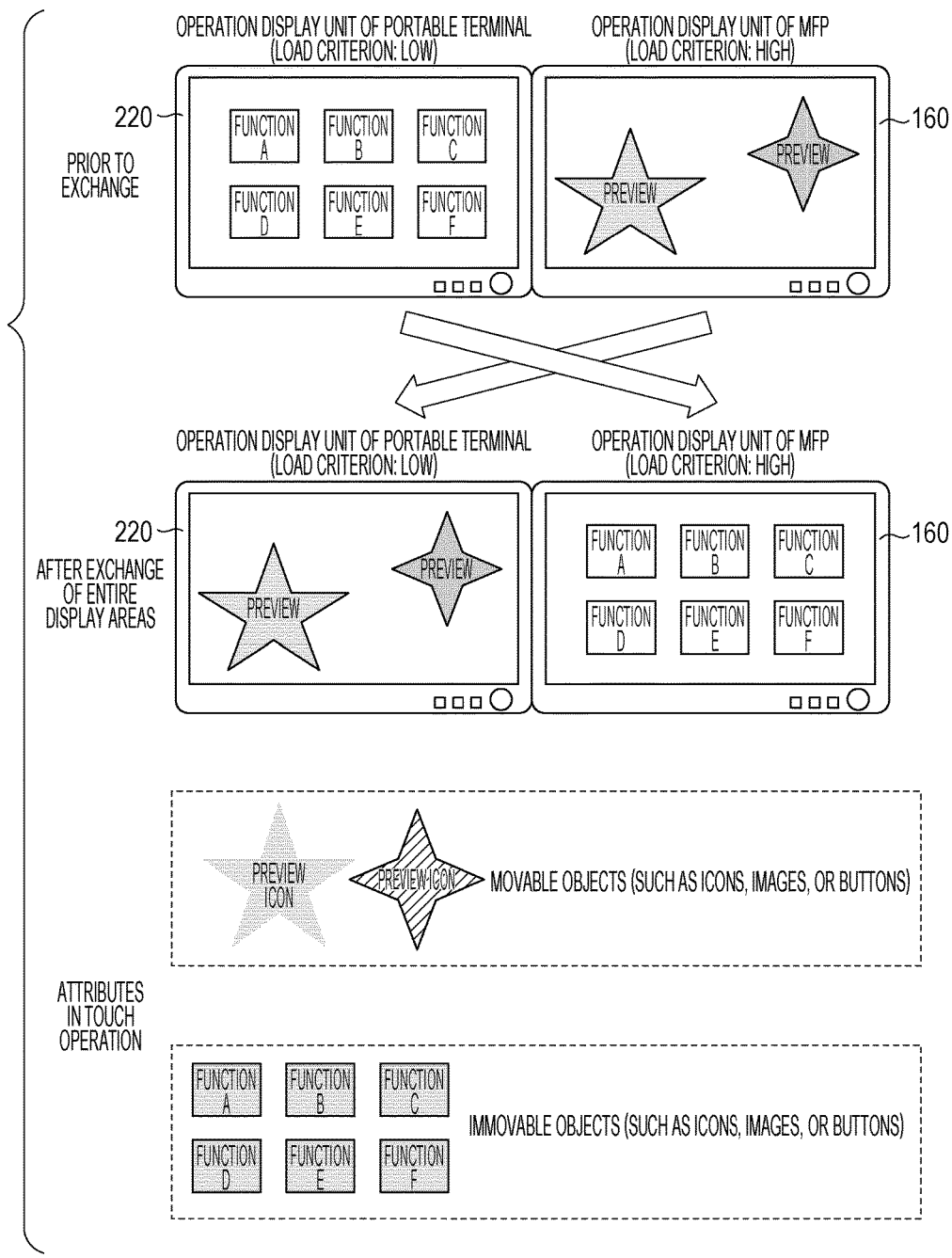
FIG. 8 is a schematic view showing an example case where entire display areas are exchanged between an MFP and a portable terminal.
Figure 9:
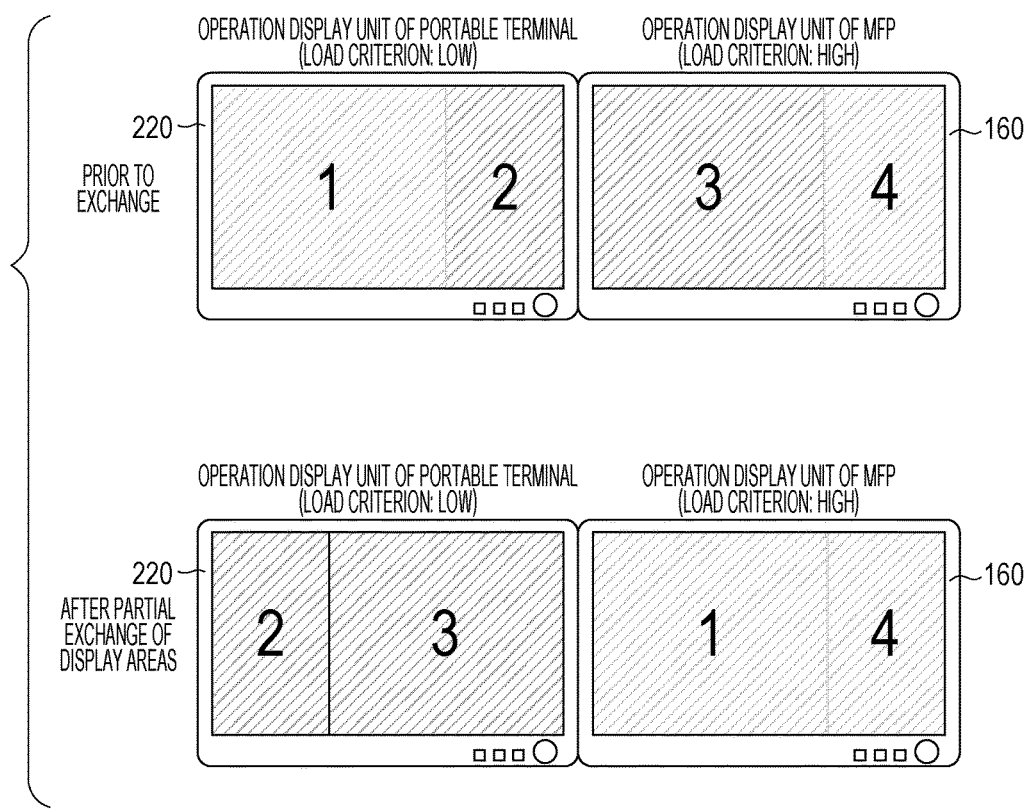
FIG. 9 is a schematic view showing an example case where display areas are partially exchanged between an MFP and a portable terminal.
Figure 10:
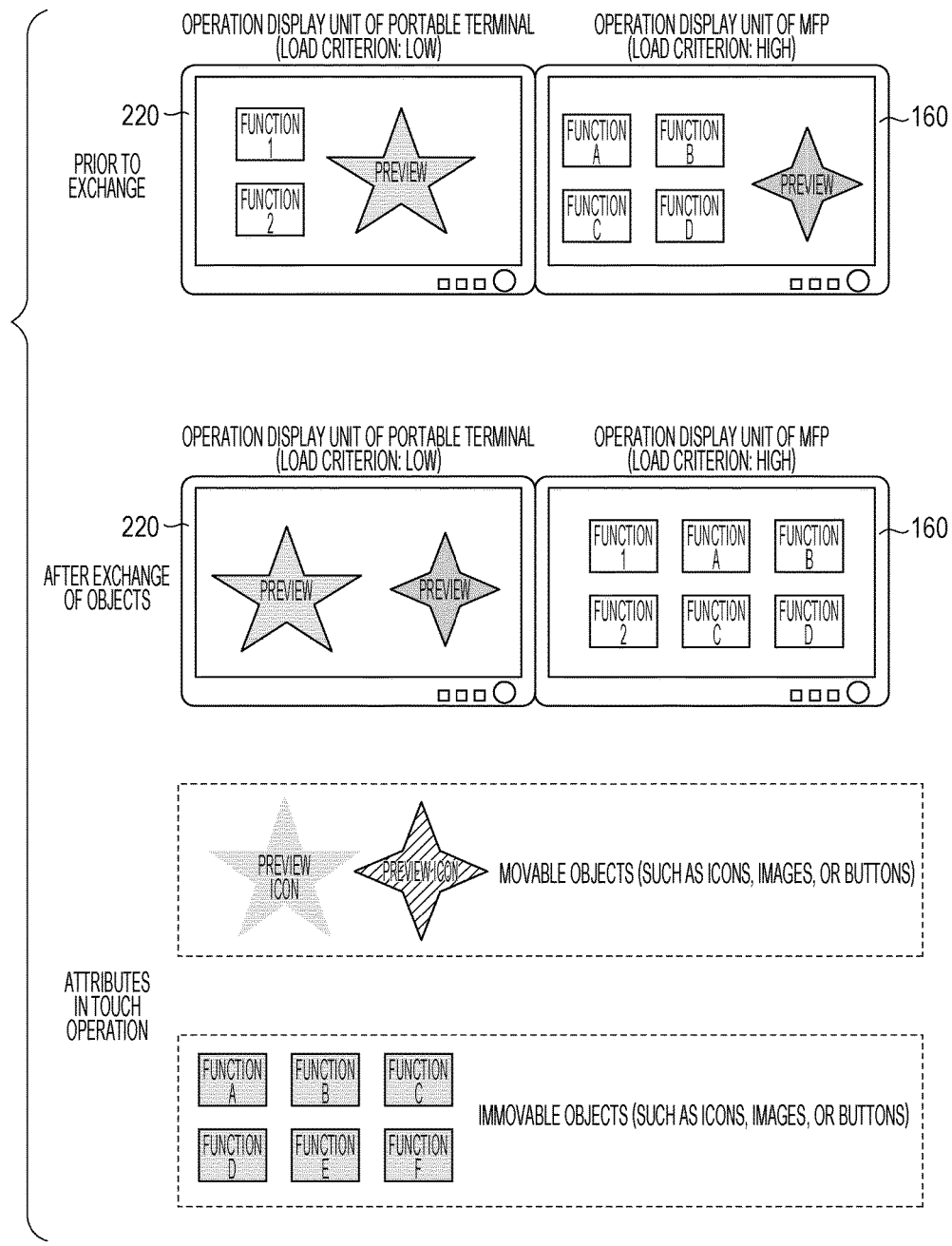
FIG. 10 is a schematic view showing an example case where objects are exchanged between an MFP and a portable terminal.

Referring now to FIGS. 8 through 10, the exchange of display content between operation display devices in this embodiment is described. FIG. 8 is a schematic view showing an example case where entire display areas are exchanged between the MFP 100 and the portable terminal 200A. FIG. 9 is a schematic view showing an example case where display areas are partially exchanged between the MFP 100 and the portable terminal 200A. FIG. 10 is a schematic view showing an example case where objects are exchanged between the MFP 100 and the portable terminal 200A. In the example cases shown in FIGS. 8 through 10, the load criterion N1 of the MFP 100 is higher than the load criterion N2 of the portable terminal 200A.

(A) Exchange of Entire Display Areas

Referring first to FIG. 8, a case where entire display areas are exchanged between the MFP 100 and the portable terminal 200A is described.

Prior to the exchange of display content, operation objects, "function A" through "function F", are displayed on the portable terminal 200A having the lower load criterion. These operation objects, "function A" through "function F", are operation objects not to be handled by touch operations, and the operability thereof hardly changes, regardless of whether they are operated (a tap operation, for example) on the MFP 100 having the higher load criterion or on the portable terminal 200A having the lower load criterion.

Meanwhile, two movable objects, "images of polygons", are displayed on the MFP 100. These movable objects are not easily moved on the MFP 100 having the higher load criterion.

After the entire display areas are exchanged between the MFP 100 and the portable terminal 200A, the movable objects, "images of polygons", are displayed on the portable terminal 200A having the lower load criterion. The operation objects, "function A" through "function F", are displayed on the MFP 100 having the higher load criterion.

Consequently, the user moves the "images of polygons" on the portable terminal 200A having the lower load criterion, and accordingly, higher operability is achieved than in a case where the "images of polygons" are moved on the MFP 100 having the higher load criterion. The operability of "function A" through "function F" hardly changes, regardless of whether they are operated on the MFP 100 having the higher load criterion or on the portable terminal 200A having the lower load criterion. Therefore, the operability of "function A" through "function F" hardly decreases. In this manner, the two movable "images of polygons" are displayed on the portable terminal 200A having the lower load criterion, and "function A" through "function F", which cannot be moved, are displayed on the MFP 100. Thus, operability deterioration due to a difference between load criteria can be prevented.

(B) Exchange of Part of Display Area

Referring now to FIG. 9, a case where display areas are partially exchanged between the MFP 100 and the portable terminal 200A is described.

Prior to the exchange of display content, a display area 1 not including any movable object, and a display area 2 including movable objects are displayed on the portable terminal 200A. Meanwhile, a display area 3 including movable objects, and a display area 4 not including any movable object are displayed on the MFP 100.

After the display area 1 of the portable terminal 200A and the display area 3 of the MFP 100 are replaced with each other, and the display sequence is rearranged, the display areas 2 and 3 are displayed on the portable terminal 200A, and the display areas 1 and 4 are displayed on the MFP 100.

Consequently, the display areas 2 and 3 including movable objects are displayed on the portable terminal 200A having the lower load criterion, and the display areas 1 and 4 not including any movable object are displayed on the MFP 100 having the higher load criterion. Thus, operability deterioration due to a difference between load criteria can be prevented.

(C) Exchange of Objects

Referring now to FIG. 10, a case where objects are exchanged between the MFP 100 and the portable terminal 200A is described.

Prior to the exchange of display content, operation objects, "function 1" and "function 2", are displayed on the portable terminal 200A. These operation objects, "function 1" and "function 2", are operation objects that cannot be moved, and the operability thereof hardly changes, regardless of whether they are operated (a tap operation, for example) on the MFP 100 having the higher load criterion or on the portable terminal 200A having the lower load criterion. Meanwhile, operation objects, "function A" through "function D", which cannot be moved, and a movable object, "an image of a polygon", are displayed on the MFP 100.

After "function 1" and "function 2" on the portable terminal 200A are replaced with the "image of a polygon" on the MFP 100, and the display sequence is rearranged, the two "images of polygons" are displayed on the portable terminal 200A. Meanwhile, "function 1", "function 2", and "function A" through "function D" are displayed on the MFP 100.

Consequently, the two movable "images of polygons" are displayed on the portable terminal 200A having the lower load criterion, and "function 1", "function 2", and "function A" through "function D", which cannot be moved, are displayed on the MFP 100 having the higher load criterion.

Thus, operability deterioration due to a difference between load criteria can be prevented.

Examples of the processing procedures according to the operation display method of this embodiment have been described above, with reference to FIGS. 6A through 6D and FIGS. 7 through 10. According to the above described operation display method, the control unit 180 acquires and compares the load criterion N1 and the load criterion N2, while the MFP 100 and the portable terminal 200A are in a cooperating state. The control unit 180 also acquires the operation types of the respective objects displayed on the screens of the MFP 100 and the portable terminal 200A, and controls the display on the screens of the MFP 100 and the portable terminal 200A in accordance with a result of the load criteria comparison and the acquired operation types. More specifically, in accordance with the comparison result and the operation types, the control unit 180 performs control to determine on which one of the MFP 100 and the portable terminal 200A movable objects are to be displayed. The control unit 180 also performs control so that movable objects are preferentially displayed on an operation display device that is the MFP 100 or the portable terminal 200A, whichever has the lower load criterion.

The operation display system, the operation display device, and the operation display program of this embodiment described so far achieve the effects described below.

(a) According to this embodiment, display on the screens of the MFP 100 and the portable terminal 200A in a cooperating state is controlled in accordance with a result of load criteria comparison and the operation types of the objects on display. Thus, deterioration of the operability of touch panels due to a difference in load criterion can be prevented.

(b) In accordance with a result of comparison between the load criterion N1 and the load criterion N2, and the types of touch panel operations to be performed for the respective objects, the control unit 180 performs control to determine on which one of the operation display unit 160 and the operation display unit 220 each of the objects is to be displayed. Thus, each of the above described objects can be displayed on an appropriate operation display device between the operation display unit 160 and the operation display unit 220, in accordance with the operability of the touch panels with respect to each of the objects.

(c) The control unit 180 performs control to determine on which one of the operation display unit 160 and the operation display unit 220 an object is to be displayed, depending on whether the object is movable. Thus, each of the above described objects can be displayed on an appropriate operation display device between the operation display unit 160 and the operation display unit 220, depending on whether the object is movable.

(d) The control unit 180 also performs control so that movable objects are preferentially displayed on an operation display device that is the operation display unit 160 or the operation display unit 220, whichever has the lower load criterion. Thus, objects that cannot be moved are displayed on the operation display device having the higher load criterion, and objects that can be moved are displayed on the operation display device having the lower load criterion.

(e) in a case where the load criterion N1 of the operation display unit 160 differs from the load criterion N2 of the operation display unit 220, the control unit 180 exchanges a display area including movable objects for a display area not including any movable object between the operation display unit 160 and the operation display unit 220. Thus, each of the display areas can be displayed on the appropriate operation display device between the operation display unit 160 and the operation display unit 220, depending on whether the display area includes movable objects.

(f) in a case where the load criterion N1 of the operation display unit 160 differs from the load criterion N2 of the operation display unit 220, the control unit 180 exchanges movable objects for immovable objects between the operation display unit 160 and the operation display unit 220. Thus, each of the above described objects can be displayed on an appropriate operation display device between the operation display unit 160 and the operation display unit 220, depending on whether the object is movable.

(g) A moving operation is at least one of the following: a flick operation, a drag operation, a swipe operation, a rotation operation, a pinch-in operation, and a pinch-out operation. In view of this, at the time of displaying, an object that can be subjected to at least one of a flick operation, a drag operation, a swipe operation, a rotation operation, a pinch-in operation, and a pinch-out operation can be replaced with an object that cannot be subjected to any of a flick operation, a swipe operation, a rotation operation, a pinch-in operation, and a pinch-out operation. Also, at the time of displaying, a display area including an object that can be subjected to at least one of a flick operation, a swipe operation, a rotation operation, a pinch-in operation, and a pinch-out operation can be replaced with a display area not including any object that can be subjected to at least one of a flick operation, a swipe operation, a rotation operation, a pinch-in operation, and a pinch-out operation.

The present invention is not limited to the above described embodiment, and various changes may be made to it within the scope of the claimed invention. For example, in the above described embodiment, an MFP and a portable terminal cooperate to implement an operation display method, and the MFP takes a leading role in the relationship between the MFP and the portable terminal. However, the present invention is not limited to such a case. For example, a server, an MFP, and a portable terminal may cooperate, and the server may take a leading role in the relationship among the server, the MFP, and the portable terminal. That is, the server may be designed to have a function to acquire load criteria and operation types, and control display on the screens of the MFP and the portable terminal in accordance with a result of load criteria comparison and the operation types.

In the above described embodiment, there is a difference in load criterion between a capacitive touch panel and a resistive touch panel. However, the present invention is not limited to such a case, and may also be applied in cases where there is a difference in load criterion between capacitive touch panels, between resistive touch panels, or between touch panels of any other type.

In the above described embodiment, it is easier to operate a capacitive touch panel than a resistive touch panel. However, it might be easier to operate a resistive touch panel, depending on the surrounding environments and the conditions of use of the touch panel. For example, in a case where the user is performing an operation wearing gloves, or where the user's finger is dry, movable objects might be preferentially displayed on an operation display device having a resistive touch panel, instead of a capacitive touch panel.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An operation display system with a plurality of operation display devices each having a touch panel, the operation display system comprising:
 a processor configured to:
  acquire load criteria serving as criteria of pressing forces for the touch panels to accept an operation,
  acquire types of operations to be performed on the touch panels with respect to objects displayed on screens of the operation display devices, the objects comprising movable objects, and
  control display on the screens of first and second operation display devices of the plurality of operation display devices to rearrange the objects in accordance with a result of comparison between the acquired load criteria and the acquired types, the first and second operation display devices being in a cooperating state, wherein
 the load criteria includes a first load criteria reflecting a minimum amount of pressing force that the touch panel of the first operation display device will accept a touch operation and a second load criteria reflecting a minimum amount of pressing force that the touch panel of the second operation display device will accept a touch operation, the minimum amount of pressing force that the touch panel of the first operation display device will accept the touch operation being different than the minimum amount of pressing force that the touch panel of the second operation display device will accept the touch operation, and
 the control of the display comprising rearranging the movable objects onto the screen of the first operation display device or onto the screen of the second operation display device based on which device possesses a lower minimum amount of pressing force that the touch panel will accept the touch operation.

2. The operation display system according to claim 1, wherein the processor performs control to have an object preferentially displayed on the operation display device having the lower load criterion between the first and second operation display devices, the object being compatible with a moving operation that is performed by touching a portion of the object and moving the touched portion.

3. The operation display system according to claim 1, wherein, when the load criterion of the first operation display device differs from the load criterion of the second operation display device, the processor exchanges entire display areas between the first operation display device and the second operation display device.

4. The operation display system according to claim 1, wherein, when the load criterion of the first operation display device differs from the load criterion of the second operation display device, the processor exchanges a display area including an object compatible with a moving operation for a display area not including any object compatible with the moving operation between the first operation display device and the second operation display device, the moving operation being performed by touching a portion of the object and moving the touched portion.

5. The operation display system according to claim 1, wherein, when the load criterion of the first operation display device differs from the load criterion of the second operation display device, the processor exchanges an object compatible with a moving operation for an object not compatible with the moving operation between the first operation display device and the second operation display device, the moving operation being performed by touching a portion of the object and moving the touched portion.

6. The operation display system according to claim 1, wherein the movable objects are movable by at least one of a drag operation, a flick operation, a swipe operation, a rotation operation, a pinch-in operation, and a pinch-out operation.

7. The operation display system according to claim 1, wherein the processor is included in one of the first and second operation display devices.

8. The operation display system according to claim 1, wherein
 the first operation display device has a capacitive touch panel,
 the second operation display device has a resistive touch panel, and
 the capacitive touch panel has a lower load criterion than the resistive touch panel.

9. The operation display system according to claim 1, wherein
 at least the first and second operation display devices are in a cooperating state such that the first and second operation display devices communicate to display objects on one large collective screen formed by the screens of at least the first and second operation display devices,
 the types of operations are acquired based on user input operations performed on the touch panels with respect to the objects displayed on the one large collective screen formed by the screens of at least the first and second operation display devices, and
 the processor is configured to control display on the one large collective screen formed by the screens of the first and second operation display devices.

10. An operation display device having a touch panel, the operation display device comprising:
 a processor configured to;
 acquire a first load criterion serving as a criterion of a pressing force for the touch panel to accept an operation, and a second load criterion serving as a criterion of a pressing force for a touch panel of other operation display device to accept an operation, the other operation display device cooperating with the operation display device,
 acquire types of operations to be performed on the touch panel with respect to objects displayed on screens of the operation display device and the other operation display device, the objects comprising movable objects; and
 control display on the screens of the operation display device and the other operation display device to rearrange the objects in accordance with a result of comparison between the acquired first load criterion and the acquired second load criterion and the acquired types, wherein
 the first load criteria reflects a minimum amount of pressing force that the touch panel will accept a touch operation and the second load criteria reflects a minimum amount of pressing force that the touch panel of the other operation display device will accept a touch operation, the minimum amount of pressing force that the touch panel of the first operation display device will accept the touch operation being different than the minimum amount of pressing force that the touch panel of the second operation display device will accept the touch operation, and the control of the display comprising rearranging the movable objects onto the screen of the operation display device or onto the screen of the other operation display device based on which device possesses a lower minimum amount of pressing force that the touch panel will accept the touch operation.

11. The operation display device according to claim 10, wherein movable objects are movable by at least one of a drag operation, a flick operation, a swipe operation, a rotation operation, a pinch-in operation, and a pinch-out operation.

12. A non-transitory recording medium storing a computer readable operation display program for controlling an operation display system including a plurality of operation display devices each having a touch panel, the operation display program causing a computer to carry out:
   acquiring load criteria serving as criteria of pressing forces for the touch panels to accept an operation;
   acquiring types of operations to be performed on the touch panels with respect to objects displayed on screens of the operation display devices, the objects comprising movable objects; and
   controlling display on the screens of first and second operation display devices of the plurality of operation display devices to rearrange the objects in accordance with a result of comparison between the acquired load criteria and the acquired types, the first and second operation display devices being in a cooperating state, wherein
   the load criteria includes a first load criteria reflecting a minimum amount of pressing force that the touch panel of the first operation display device will accept a touch operation and a second load criteria reflecting a minimum amount of pressing force that the touch panel of the second operation display device will accept a touch operation, the minimum amount of pressing force that the touch panel of the first operation display device will accept the touch operation being different than the minimum amount of pressing force that the touch panel of the second operation display device will accept the touch operation, and
   the control of the display comprising rearranging the movable objects onto the screen of the first operation display device or onto the screen of the second operation display device based on which device possesses a lower minimum amount of pressing force that the touch panel will accept the touch operation.

13. The non-transitory recording medium storing a computer readable operation display program according to claim 12, wherein the movable objects are movable by at least one of a drag operation, a flick operation, a swipe operation, a rotation operation, a pinch-in operation, and a pinch-out operation.

14. A non-transitory recording medium storing a computer readable operation display program for controlling an operation display device having a touch panel, the operation display program causing a computer to carry out:
   acquiring a first load criterion serving as a criterion of a pressing force for the touch panel to accept an operation, and a second load criterion serving as a criterion of a pressing force for a touch panel of other operation display device to accept an operation, the other operation display device cooperating with the operation display device;
   acquiring types of operations to be performed on the touch panels with respect to objects displayed on screens of the operation display device and the other operation display device, the objects comprising movable objects; and
   controlling display on the screens of the operation display device and the other operation display device to rearrange the objects in accordance with a result of comparison between the acquired first load criterion and the acquired second load criterion and the acquired types, wherein
   the first load criteria reflects a minimum amount of pressing force that the touch panel will accept a touch operation and the second load criteria reflects a minimum amount of pressing force that the touch panel of the other operation display device will accept a touch operation, the minimum amount of pressing force that the touch panel of the first operation display device will accept the touch operation being different than the minimum amount of pressing force that the touch panel of the second operation display device will accept the touch operation, and
   the control of the display comprising rearranging the movable objects onto the screen of the operation display device or onto the screen of the other operation display device based on which device possesses a lower minimum amount of pressing force that the touch panel will accept the touch operation.

15. The non-transitory recording medium storing a computer readable operation display program according to claim 14, wherein the movable objects are movable by at least one of a drag operation, a flick operation, a swipe operation, a rotation operation, a pinch-in operation, and a pinch-out operation.

* * * * *